(12) United States Patent
Saurel et al.

(10) Patent No.: US 9,870,417 B2
(45) Date of Patent: Jan. 16, 2018

(54) MERGING BUSINESS OBJECT HIERARCHIES

(71) Applicants: Pierre Saurel, Colombes (FR); Jacques Doan Huu, Guyancourt (FR)

(72) Inventors: Pierre Saurel, Colombes (FR); Jacques Doan Huu, Guyancourt (FR)

(73) Assignee: Business Objects Software Ltd., Dublin (IE)

( * ) Notice: Subject to any disclaimer, the term of this patent is extended or adjusted under 35 U.S.C. 154(b) by 269 days.

(21) Appl. No.: 14/258,250

(22) Filed: Apr. 22, 2014

(65) Prior Publication Data

US 2015/0302015 A1 Oct. 22, 2015

(51) Int. Cl.
*G06F 7/00* (2006.01)
*G06F 17/30* (2006.01)

(52) U.S. Cl.
CPC .. *G06F 17/30589* (2013.01); *G06F 17/30076* (2013.01); *G06F 17/30091* (2013.01); *G06F 17/30221* (2013.01); *G06F 17/30312* (2013.01); *G06F 17/30336* (2013.01); *G06F 17/30489* (2013.01)

(58) Field of Classification Search
None
See application file for complete search history.

(56) References Cited

U.S. PATENT DOCUMENTS

| | | | |
|---|---|---|---|
| 7,257,599 B2 | 8/2007 | Sauermann et al. | |
| 7,613,688 B2 | 11/2009 | Wiest et al. | |
| 7,814,428 B2 | 10/2010 | Bicker et al. | |
| 7,945,600 B1 | 5/2011 | Thomas et al. | |
| 7,992,078 B2 | 8/2011 | Penner et al. | |
| 8,046,673 B2 | 10/2011 | Polo-Malouvier et al. | |
| 8,095,532 B2 | 1/2012 | Treleaven | |
| 8,291,313 B1 | 10/2012 | Monikandan | |
| 8,296,303 B2 | 10/2012 | Navas | |
| 8,316,012 B2 | 11/2012 | Abouzeid et al. | |
| 8,375,029 B2 * | 2/2013 | Cui | 707/718 |
| 8,386,469 B2 | 2/2013 | Reuther et al. | |
| 8,396,827 B2 | 3/2013 | Gross et al. | |
| 8,407,164 B2 | 3/2013 | Malik et al. | |
| 8,589,270 B2 * | 11/2013 | Corbo | G06Q 30/0202 705/35 |
| 9,208,596 B2 * | 12/2015 | Gibson | G06T 11/60 |
| 2007/0022103 A1 | 1/2007 | Rys et al. | |
| 2007/0136364 A1 * | 6/2007 | Mejia | G06F 9/548 |

(Continued)

*Primary Examiner* — Uyen Le (74) *Attorney, Agent, or Firm* — Fish & Richardson P.C.

(57) ABSTRACT

The present disclosure involves systems, software, and computer-implemented methods for merging object hierarchies. An example method includes identifying a first object hierarchy including one or more objects, each of the one or more objects representing a query associated with a data set; identifying a second object hierarchy including one or more objects; and generating a merged object hierarchy including the one or more objects from the first object hierarchy and the one or more objects from second object hierarchy, the merged hierarchy combining objects from the first and second object hierarchies that match and share a common parent object, and separately maintaining objects from the first and second object hierarchies that match and do not share a common parent object.

12 Claims, 7 Drawing Sheets

(56) References Cited

U.S. PATENT DOCUMENTS

| | | | |
|---|---|---|---|
| 2008/0288889 A1* | 11/2008 | Hunt | G06Q 30/02 |
| | | | 715/810 |
| 2012/0084325 A1* | 4/2012 | Bansode | G06F 17/30592 |
| | | | 707/792 |
| 2013/0166547 A1 | 6/2013 | Pasumarthi et al. | |
| 2013/0191328 A1 | 7/2013 | Hackmann et al. | |

* cited by examiner

MERGING BUSINESS OBJECT HIERARCHIES

BACKGROUND

The present disclosure involves systems, software, and computer-implemented methods for merging object hierarchies.

Data reporting systems generally allow information from particular data sets to be presented to users as part of reports. The data sets may be stored in databases or other types of storage. Data objects representing queries against the data sets may be defined and used to build the reports.

SUMMARY

The present disclosure involves systems, software, and computer-implemented methods for merging object hierarchies. In one general aspect, an example method includes identifying a first object hierarchy including one or more objects, each of the one or more objects representing a query associated with a data set; identifying a second object hierarchy including one or more objects; and generating a merged object hierarchy including the one or more objects from the first object hierarchy and the one or more objects from second object hierarchy, the merged hierarchy combining objects from the first and second object hierarchies that match and share a common parent object, and separately maintaining objects from the first and second object hierarchies that match and do not share a common parent object.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

This disclosure generally describes computer-implemented methods, computer-program products, and systems for merging object hierarchies.

In data reporting and other systems, business objects representing queries against a particular data set are often organized into hierarchies. For example, a data object may include an attribute identify a parent data object that is above it in a hierarchy. Such structures may be nested to allow for hierarchies of various depths. In some cases, more than one data object may share a common parent object, leading to a group of objects organized under the common parent object. In some cases, the same object may appear in different hierarchies, such as, for example, in data received from different data sources or in data stored by other components of the same system.

Users of such a system may desire merged data views that include business objects organized in the different hierarchies, such as views that include data from different data sources or data providers. Some systems may present the hierarchies separately, which does not provide the merged view of the data desired by the user. Other systems may include special rules and instructions for merging particular hierarchies, which may be time consuming to develop and maintain as data organization changes.

Accordingly, the present disclosure describes techniques for automatically merging data object hierarchies. In one example method, a first object hierarchy is identified including one or more objects, each of the one or more objects representing a query associated with a data set. A second, different object hierarchy including one or more objects is also identified. A merged object hierarchy including the one or more objects from the first object hierarchy and the one or more objects from second object hierarchy is generated. The merged hierarchy combines objects from the first and second object hierarchies that match and share a common parent object, and separately maintains objects and their descendants from the first and second object hierarchies that match and do not share a common parent object.

Implementations according to the present disclosure may provide several advantages over prior techniques. Presenting merged hierarchies may allow users to view data from different hierarchies in a unified way, which may allow for more efficient and precise analysis. Data from different data providers may also be presented in a unified way in such a merged hierarchy, such as, for example, by performing indicator comparisons between the data as described herein. Further, merging data object hierarchies generically as described herein alleviates the need for specific merging routines for different data organization schemes, which may be difficult to maintain and error prone.

Figure 1:
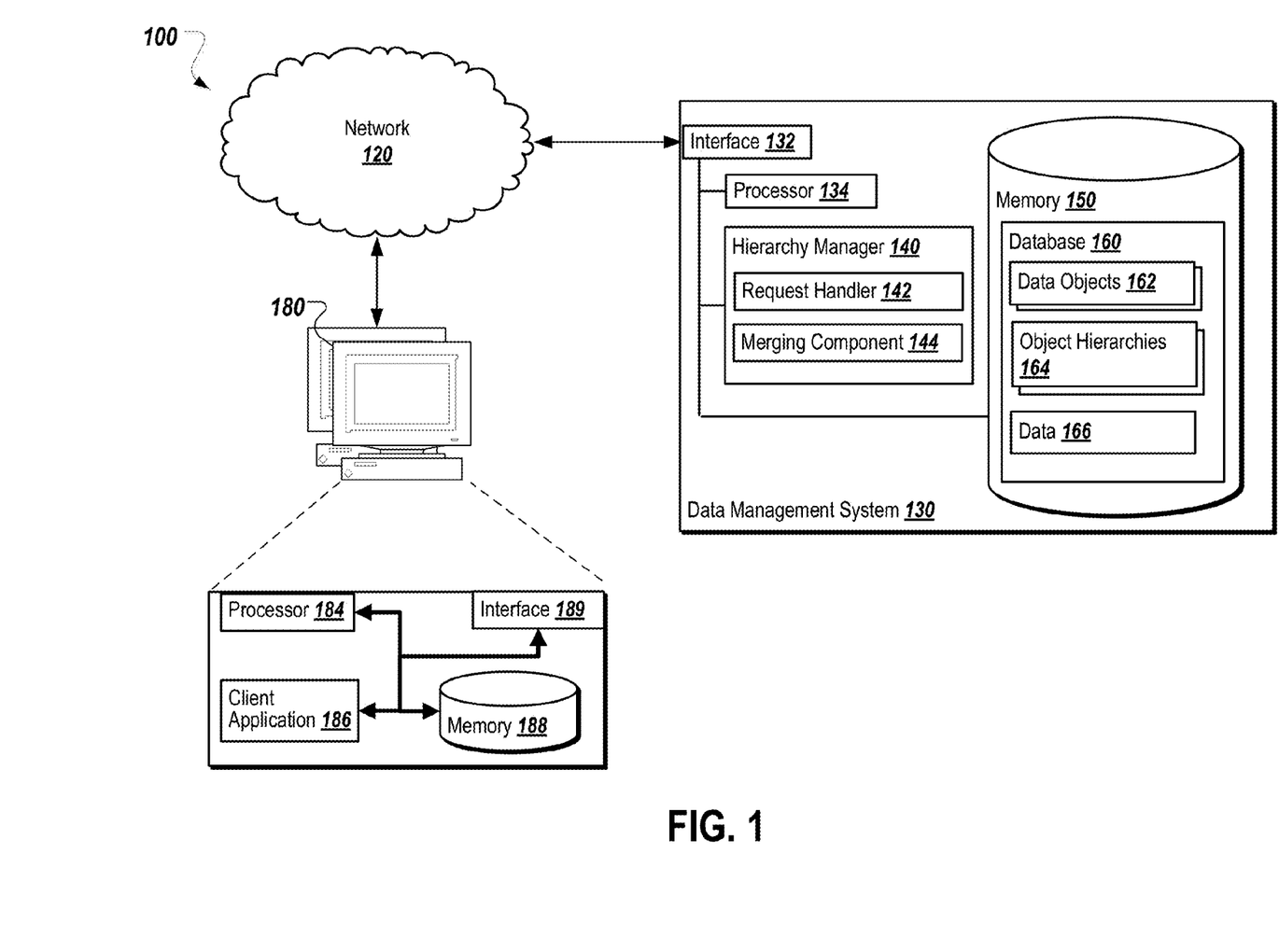
FIG. 1 is a block diagram illustrating an example environment for merging object hierarchies.

FIG. 1 is a block diagram illustrating an example environment 100 for merging object hierarchies. As shown, environment 100 includes a network 120 connected to a data management system 130 and one or more clients 180. The data management system 130 includes a database 160 storing one or more business objects 162. Each data object represents a query on a particular data set. As previously discussed, the business objects 162 may be arranged into one or more object hierarchies 164, such that a particular data object 162 may be part of one or more of the object hierarchies 164. In operation, the one or more clients 180 may request that two or more of the object hierarchies 164 be merged, such as for presentation as part of a report to be viewed by a user. The data management system 130 receives such a request, merges the two requested hierarchies into a merged hierarchy, in response to the requesting client 180 with the merged hierarchy. The techniques used to merge the two hierarchies are described in greater detail below.

The example environment hundred includes a data management system 130. In some implementations, the data management system 130 may be operable to maintain and manage the business objects 162 and data object hierarchies 164, receive requests to merge the data object hierarchies 164, perform the requested merges, and return the resulting merged hierarchies. In some implementations, the data management system 130 may be a computer or set of computers operable to perform these operations. In some cases, the various operations may be performed by different servers communicating with one another, such as over the network 120.

As used in the present disclosure, the term "computer" is intended to encompass any suitable processing device. For example, although FIG. 1 illustrates a data management system 130, environment 100 can be implemented using two or more servers, as well as computers other than servers, including a server pool. Indeed, data management system 130 may be any computer or processing device such as, for example, a blade server, general-purpose personal computer (PC), MAC, workstation, UNIX-based workstation, or any other suitable device. In other words, the present disclosure contemplates computers other than general purpose computers, as well as computers without conventional operating systems. Further, illustrated data management system 130 may be adapted to execute any operating system, including LINUX, UNIX, WINDOWS, MAC OS, JAVA, ANDROID, iOS or any other suitable operating system. According to one implementation, data management system 130 may also include or be communicably coupled with an e-mail server, a Web server, a caching server, a streaming data server, and/or other suitable server.

The data management system 130 also includes an interface 132, a processor 134, and a memory 150. The interface 132 is used by the data management system 130 for communicating with other systems in a distributed environment—including within the environment 100—connected to the network 120; for example, the clients 180, as well as other systems communicably coupled to the network 120 (not illustrated). Generally, the interface 132 comprises logic encoded in software and/or hardware in a suitable combination and operable to communicate with the network 120. More specifically, the interface 132 may comprise software supporting one or more communication protocols associated with communications such that the network 120 or interface's hardware is operable to communicate physical signals within and outside of the illustrated environment 100.

As illustrated in FIG. 1, the data management system 130 includes a processor 134. Although illustrated as a single processor 134 in FIG. 1, two or more processors may be used according to particular needs, desires, or particular implementations of environment 100. Each processor 134 may be a central processing unit (CPU), a blade, an application specific integrated circuit (ASIC), a field-programmable gate array (FPGA), or another suitable component. Generally, the processor 134 executes instructions and manipulates data to perform the operations of the data management system 130.

The data management system 130 includes a calculation engine 140. In operation, the calculation engine 140 may receive requests from the one or more clients 180, identify the hierarchies 164 within the database 160 there are to be merged, merge the hierarchies 164 into a merged hierarchy, and return the merged hierarchy to the requesting client 180. In some implementations, the calculation engine 140 may be a software program or set of software programs executing on the data management system 130. The calculation engine 140 may also be a separate component from the data management system 130, such as an external server or set of servers. In some cases, the calculation engine 140 may be implemented as a set of routines within the database 160, such as, for example, triggers, stored procedures, scripts, or other types of routines.

As shown, the calculation engine 140 includes a request handler 142. In operation, the request handler 142 receives requests from the one or more clients 180 over the network 120. In some implementations, the request handler 142 may receive requests and send responses to the requests according to one or more network protocols, such as, for example, Hypertext Transfer Protocol (HTTP), Simple Object Access Protocol (SOAP), Remote Procedure Call (RPC), or other network protocols. In some cases, the request handler 142 may receive explicit requests to merge two or more of the object hierarchies 164 stored in the database 160. The request handler 142 may also receive requests for one or more of the hierarchies 164, and analyze the request to determine whether to merge the requested hierarchies 164. In some implementations, the request handler 142 may be a software module within the calculation engine 140. The request handler 142 may also be a software program or set of software programs separate from the calculation engine 140.

The calculation engine 140 also includes a merging component 144. In operation, the merging component 144 examines the requested object hierarchies 164, determines how to properly merge the requested object hierarchies 164, and merges the object hierarchies 164 to produce a merged hierarchy. In some implementations, the merging component 144 merges a first object hierarchy and a second object hierarchy by first examining the second hierarchies to determine whether each object in the second object hierarchy matches an object in the first object hierarchy. For an object that matches, and thus occurs in both hierarchies, the merging component 144 determines whether the object in the second object hierarchy has a parent object. If the object has a parent object, the merging component 144 determines whether the matching object in the first hierarchy has the same parent object. If both objects have the same parent, or if one of the objects has no parent object, the merging component 144 creates a merged object including the data from both instances of the matching data object, and inserts this merged object into the merged hierarchy. If the parent objects do not match, the merging component 144 separately maintains both objects within the merged hierarchy, and does not perform a merge. The descendants of the objects are also maintained. Examples of these situations are shown in and described relative to FIGS. 2-5.

The merging component 144 may determine that two of the business objects 162 match by comparing a key value associated with the objects. For example, each data object 162 may be associated an identifier, such that the business objects 162 have the same identifier they match. In some implementations, if two of the business objects 162 match they may represent identical queries against the same data set. In cases where two of the business objects 162 have originated from different data sources, the merging component 144 may determine that two of the business objects 162 match by comparing a name associated with the objects. In such cases, the merging component 144 assumes that if the objects share a common name they match.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The data management system 130 also includes a memory 150 or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the data management system 130. Additionally, the memory 150 may include any other appropriate data, such as VPN applications, firmware logs and policies, firewall policies, a security or access log, print or other reporting files, as well as others.

As illustrated in FIG. 1, memory 150 includes or references data and information associated with and/or related to providing the network service load control. As illustrated, memory 150 includes a database 160. The database 160 may be one of or a combination of several commercially available database and non-database products. Acceptable products include, but are not limited to, SAP® HANA DB, SAP® MaxDB, Sybase® ASE, Oracle® databases, IBM® Informix® databases, DB2, MySQL, Microsoft SQL Server®, Ingres®, PostgreSQL, Teradata, Amazon SimpleDB, and Microsoft® Excel, as well as other suitable database and non-database products. Further, database 160 may be operable to process queries specified in any structured or other query language such as, for example, Structured Query Language (SQL).

As shown, the database 160 includes one or more business objects 162. In some implementations, each data object 162 represents a query against a particular data set from within the data 166. For example, a particular data object 162 may represent a query spanning multiple database tables with particular criteria. In some cases, the query associated with particular data object 162 may be defined by a query language, such as, for example, Multidimensional Expressions (MDX), Structured Query Language (SQL), or other query languages. In some cases, business objects 162 are stored within the database 160 as views. The business objects 162 may also be stored within the database 160 as triggers, stored procedures, programs, rows within tables, or other structures within the database 160. If the database 160 is an object-oriented database, the business objects 162 may be stored natively as objects.

The database 160 includes one or more object hierarchies 164. In operation, the object hierarchies 164 defined relationships between the one or more business objects 162. In some cases, the object hierarchies 164 may be stored separately from the business objects 162. The object hierarchies 162 may also be implied by relationships stored within the business objects 162, such as, for example, identifiers within the business objects 162 of parent objects, child objects, or other relationships between the business objects 162. In some implementations, the object hierarchies 164 may include identifiers by which the requesting client 180 may refer to the object hierarchies 164 when requesting that two or more of the object hierarchies 164 be merged into a merged hierarchy.

Database 160 also includes data 166. In some implementations, the business objects 162 represent queries against the data 166. The data 166 may represent any kind of data, including, but not limited to, statistical data, accounting data, inventory data, profitability data, or other types of data.

Illustrated client 180 is intended to encompass any computing device, such as a desktop computer, laptop/notebook computer, wireless data port, smart phone, personal data assistant (PDA), tablet computing device, one or more processors within these devices, or any other suitable processing device. For example, client 180 may comprise a computer that includes an input device, such as a keypad, touch screen, or other device that can accept user information and an output device that conveys information associated with the operation of the data management system 130 or client 180 itself, including digital data, visual information, or a graphical user interface (GUI). Client 180 may include an interface 189, a processor 184, a memory 188 and a client application 186. In some implementations, the client application 186 may be a web browser. Client 180 may be used by a user to access the data management system 130 to request merges of the object hierarchies 164.

Figure 2:
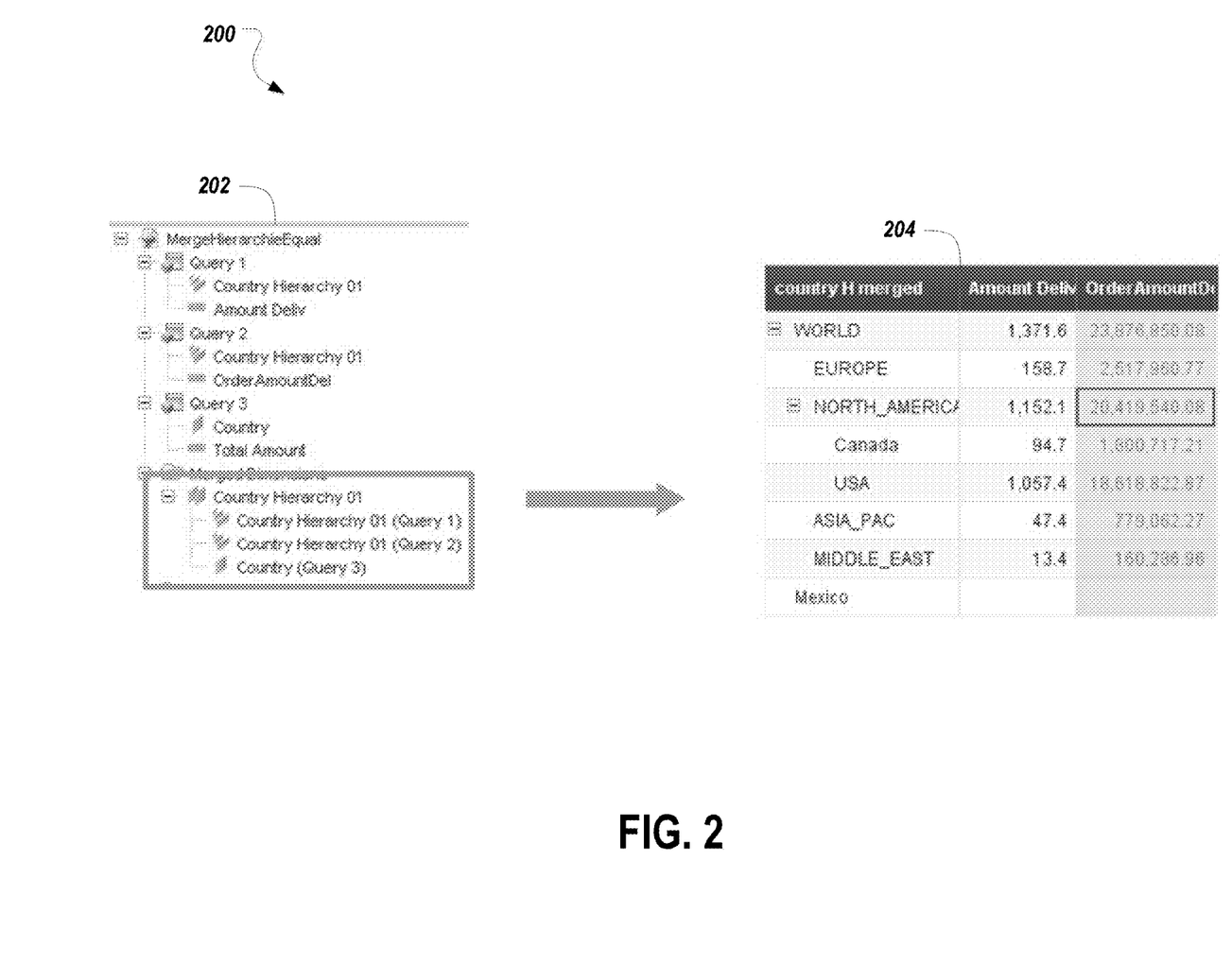
FIG. 2 is a block diagram illustrating an example object hierarchy.

FIG. 2 is a block diagram illustrating an example object hierarchy 200. The view 202 shows a report defined to include a hierarchy of countries, and two columns of data associated with each country and each group of countries. The view 204 shows the data output by the report, including the hierarchy of countries and the two columns of data for each country and for each group of countries. For example, the "North America" group includes "Canada" and "USA." Canada and USA are each business objects, such as the business objects 162 described relative to FIG. 1. North America is also a data object, and is the parent data object of both Canada and USA.

Figure 3:
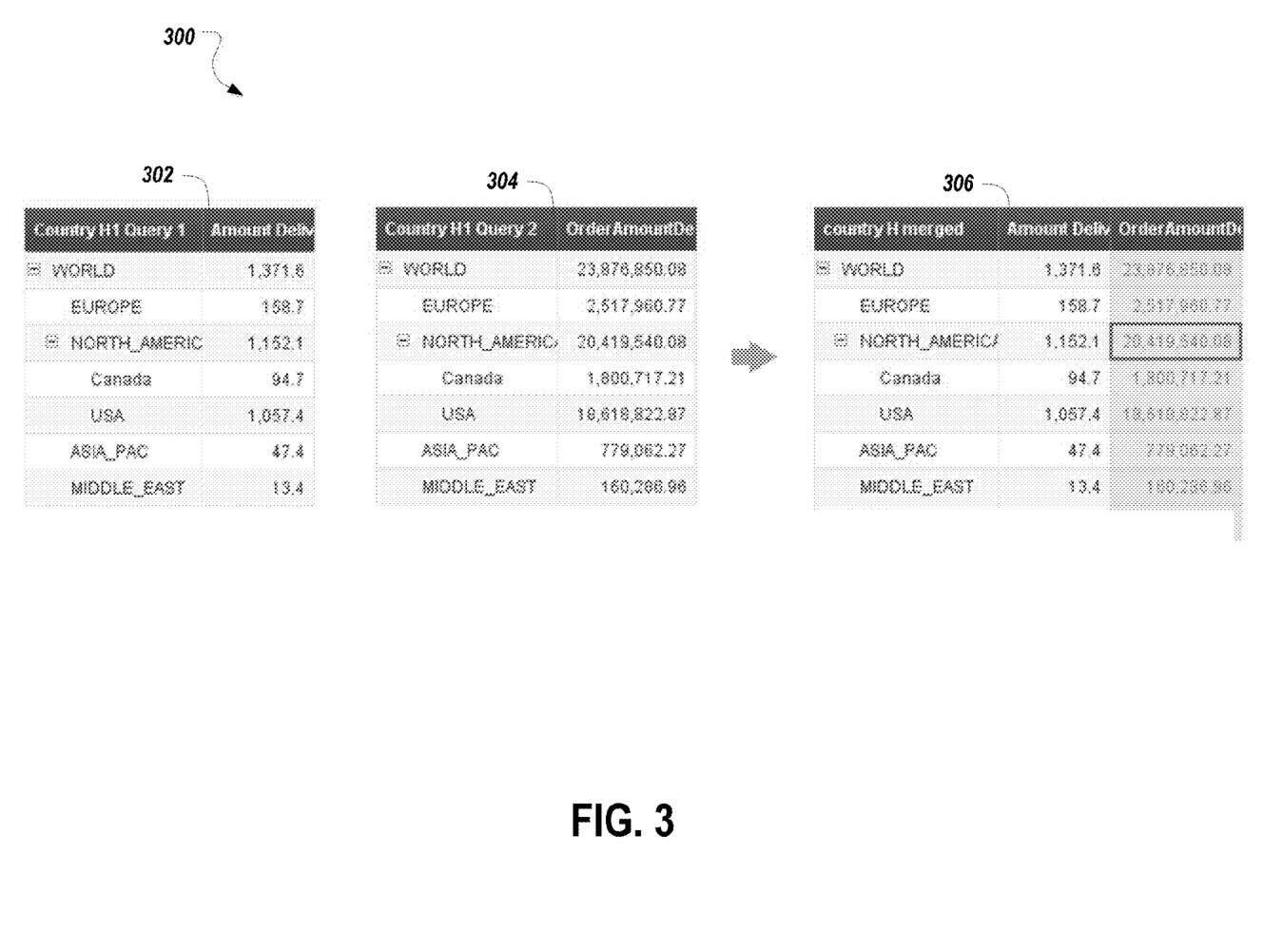
FIG. 3 is a block diagram illustrating two example object hierarchies and an example merged hierarchy resulting from applying an implementation of the present techniques.

FIG. 3 is a block diagram 300 illustrating two example object hierarchies 302, 304 and an example merged hierarchy 306 resulting from applying an implementation of the present techniques. As shown, the object hierarchies 302 and 304 are structurally identical, but are associated with different columns of data. The merged hierarchy 306, accordingly, shares the same structure as the object hierarchies 302 and 304, but is associated with both data columns from the object hierarchies 302 and 304.

In the case of merging hierarchies from different data providers, but based on the same hierarchy from the same data source (such as shown in FIG. 3), a replication of the hierarchy is returned corresponding to the subset of the hierarchy given in the result set. The object comparison (for matching) may be performed by first comparing the object key (e.g., an object identifier), and then by comparing the object name (e.g., an element caption). As shown, the common objects in both hierarchies are replicated only once, as indicated, for example, by "USA" having only one entry in the merged hierarchy 306.

Figure 4:
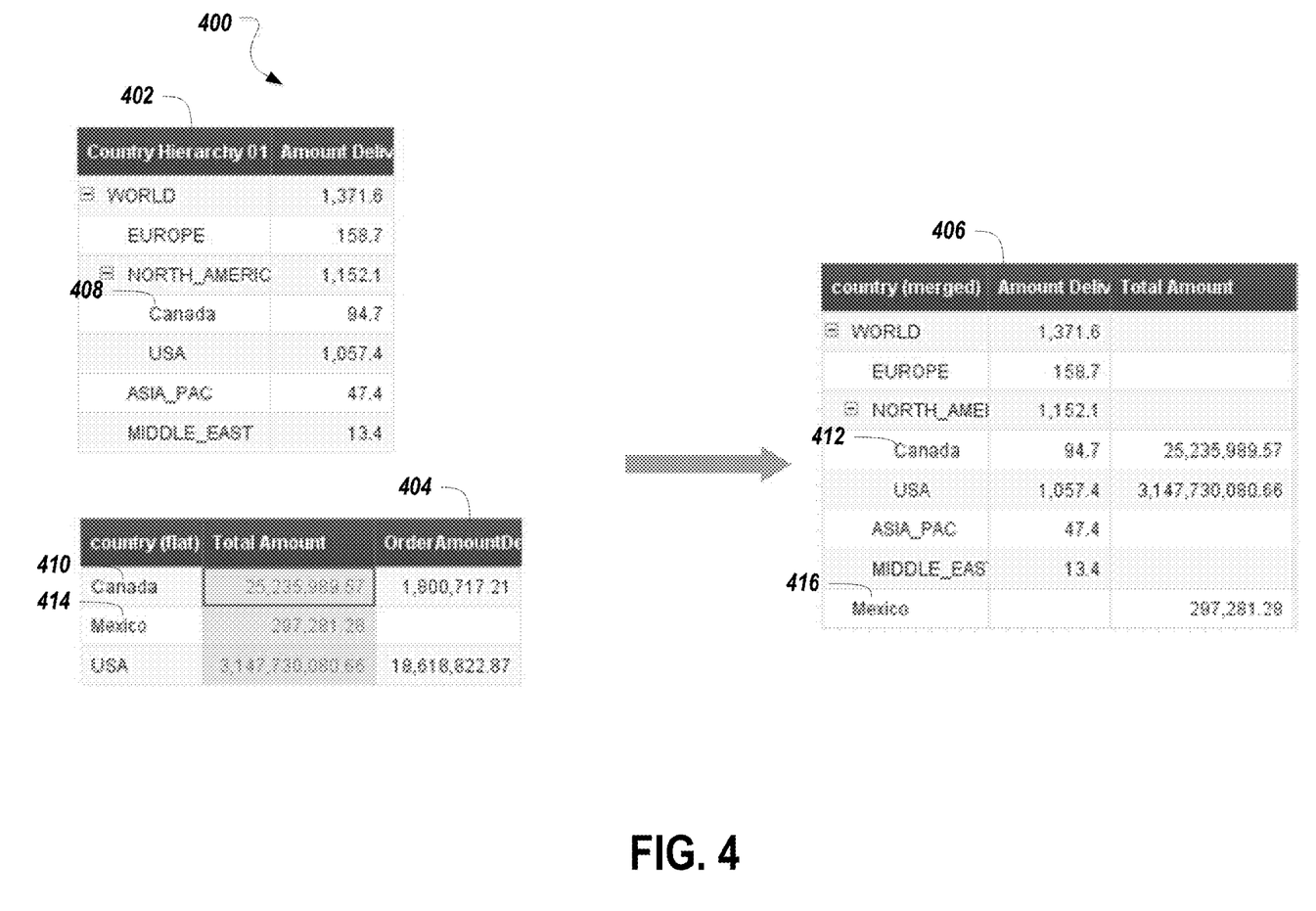
FIG. 4 is a block diagram illustrating two example object hierarchies and an example merged hierarchy including a separately maintained object.

FIG. 4 is a block diagram 400 illustrating two example object hierarchies 402, 404 and an example merged hierarchy 406 including a separately maintained object. As shown, object hierarchy 402 includes Canada data object 408, and object hierarchy 404 includes a matching Canada data object 410. The merged hierarchy 406 includes a merged Canada data object 412 that includes the data from both Canada business objects 408 and 410. Because Canada data object 410 in object hierarchy 404 does not have a parent object, object 410 is merged into object hierarchy 402.

Object hierarchy 404 also includes Mexico data object 414. As shown, the object hierarchy 402 does not include a matching data object for Mexico data object 414. Accordingly, Mexico data object 414 is maintained in the merged hierarchy 406 as it appears in object hierarchy 404, and is not merged.

Figure 5:
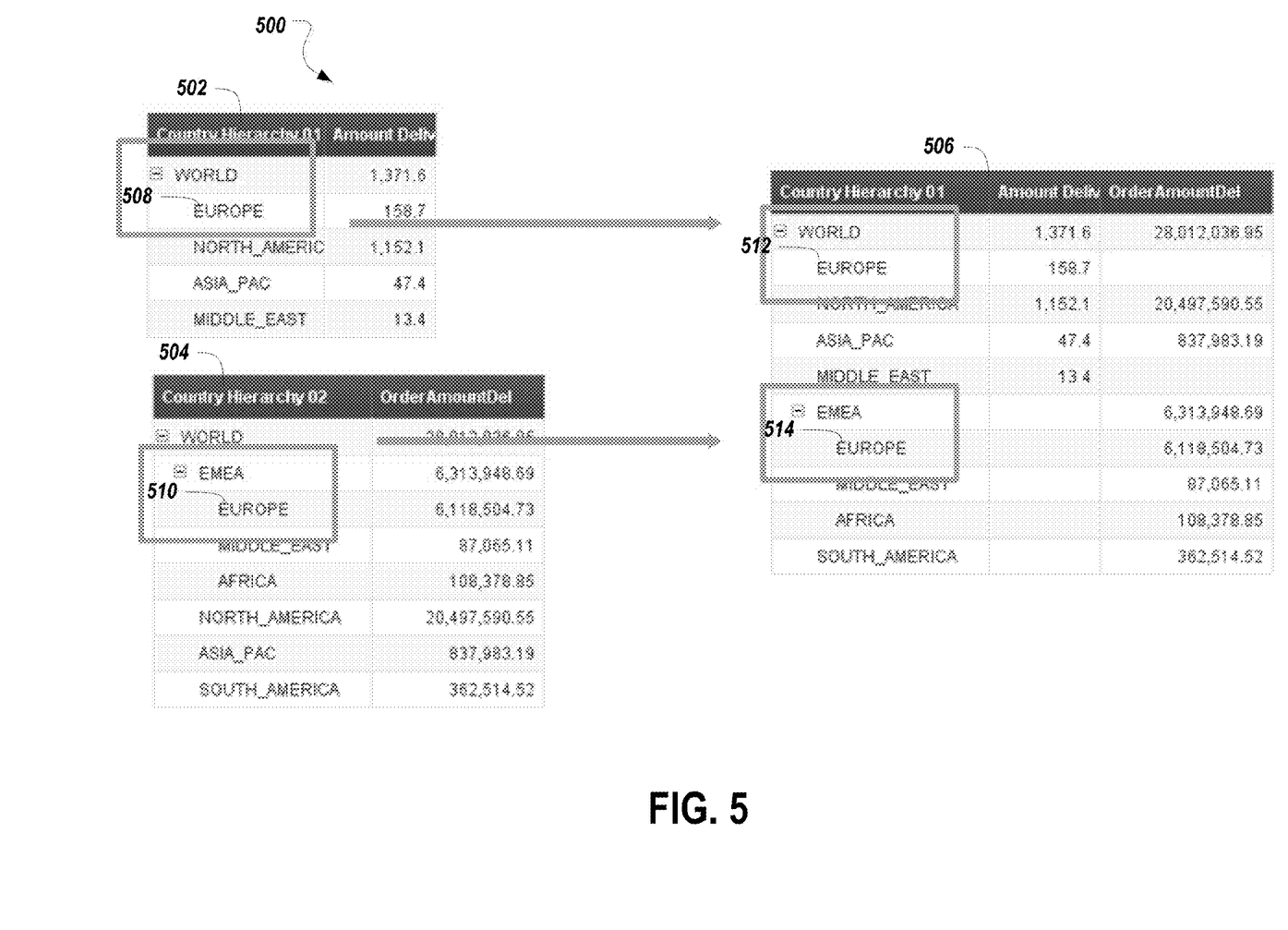
FIG. 5 is a block diagram illustrating two example object hierarchies and an example merged hierarchy including two separately maintained objects.

FIG. 5 is a block diagram illustrating two example object hierarchies 502, 504 and an example merged hierarchy 506 including two separately maintained objects. As shown, object hierarchy 502 includes a Europe data object 508. Object hierarchy 502 also includes a Europe data object 510. Europe data object 508 has a different parent object ("World") than Europe data object 510 ("EMEA"). Accordingly, both Europe business objects 508 and 510 are separately maintained within the merged hierarchy 506, shown as objects 512 and 514.

In some implementations, objects that are common between hierarchies to merge but have different parent objects in each respective original hierarchy are replicated as many times as they have different parent objects in each hierarchy. Child objects are also replicated along with their parent objects. Each object may be given an internal key for differentiation within the merged hierarchy 506, such as, for example, a key based on the original object identifier and a key of the related data provider.

In some cases, objects in a second hierarchy without an explicitly matching object in the first hierarchy may be merged based on a technique called "over fetching." If an object in the first hierarchy includes some data associated with the object, but doesn't include other data due to a filter or member selection, the object from the second hierarchy may be merged into the first hierarchy. For example, assume the first hierarchy includes an object called "World" represent aggregate statistics for all countries, and "World" has two child objects, "USA" and "Canada." If the hierarchy is merged with a second, flat hierarchy including "USA," "Canada," and "China" objects, the "China" object may be inserted into the resulting merged hierarchy with "World" as its parent. This is done because to calculate the "World" aggregate values, the system must select the values for China, and therefore will match the "China" object to this "over fetch" even though China does not appear in the original first hierarchy. The data has thus been selected on the database side, but is excluded from the query results. Therefore, the system can use this "overfetched" server side data to populate the merged hierarchy.

In some cases, the order of the objects with same parent object in the merged hierarchy is based on the lexicographical order of the name or caption of the object. In some cases, any order present in the original hierarchy before the merge is ignored due to possible conflicts between different hierarchies. When merging identical hierarchies, order may be maintained.

Once a merged hierarchy is created, new data received from data providers into the original hierarchies may be synchronized to the merged hierarchy automatically.

Figure 6:
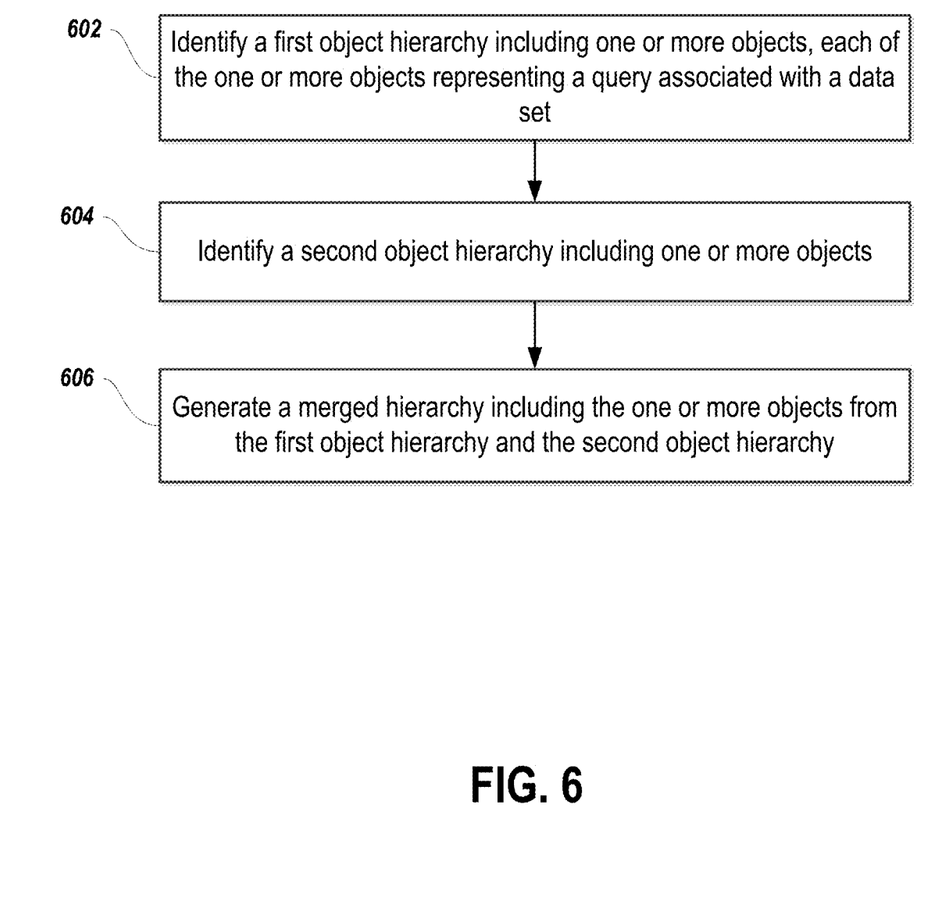
FIG. 6 is flow chart showing an example method for merging object hierarchies.

FIG. 6 is flow chart showing an example method 600 for merging object hierarchies. For clarity of presentation, the description that follows generally describes method 600 in the context of FIGS. 1-5. However, method 600 may be performed, for example, by any other suitable system, environment, software, and hardware, or a combination of systems, environments, software, and hardware, as appropriate. For example, one or more of the data management system, the client, or other computing device (not illustrated) can be used to execute method 600 and obtain any data from the memory of the client, data management system, or the other computing device (not illustrated).

At 602, a first object hierarchy including one or more objects identified, each of the one or more objects representing a query associated with the data set. At 604, a second object hierarchy including one or more object is identified.

At 606, a merged hierarchy is generated including the one or more objects from the first object hierarchy and the second object hierarchy. In some implementations, generating the merged hierarchy includes, for each object in the second object hierarchy determining whether the object in the second object hierarchy matches an object in the first object hierarchy. In response to a determination that the object in the second object hierarchy matches an object in the first hierarchy, a determination is then made whether the object in the second object hierarchy has a parent object. A determination is then made whether the parent object of the object in the second object hierarchy matches a parent object of the object in the first object hierarchy. In response to a determination that that the parent object of the object in the second object hierarchy matches a parent object of the object in the first object hierarchy, the object from the first object hierarchy and the object from the second object hierarchy are merged.

In some implementations, the object from the second object hierarchy is separately maintained in the merged hierarchy in response to a determination that the parent object of the object in the second object hierarchy does not match a parent object of the object in the first object hierarchy. In some cases, descendants of the object from the second object hierarchy are also separately maintained in the merged hierarchy.

In some cases, determining whether the object in the second object hierarchy matches the object in the first object hierarchy includes comparing a key value associated with the objects. For example, key values may be compared when objects are from the same data source. Determining whether the object in the second object hierarchy matches the object in the first object hierarchy may also include determining that the objects are from different data sources, and comparing a name associated with the objects upon determining that the objects are from different data sources.

In some implementations, the object from the first object hierarchy and the object from the second object hierarchy may be merged in response to a determination that the object in the second object hierarchy does not have a parent object and a determination that the object in the second object hierarchy matches an object in the first object hierarchy.

Merging the object from the first object hierarchy and the object from the second object hierarchy may include inserting a merged object into the merged hierarchy, the merged object including data from the object in the first object hierarchy and the object in the second object hierarchy. Separately maintaining the object from the second object hierarchy in the merged object hierarchy may include inserting both the object from the first object hierarchy and the object from the second object hierarchy into the merged hierarchy.

Figure 7:
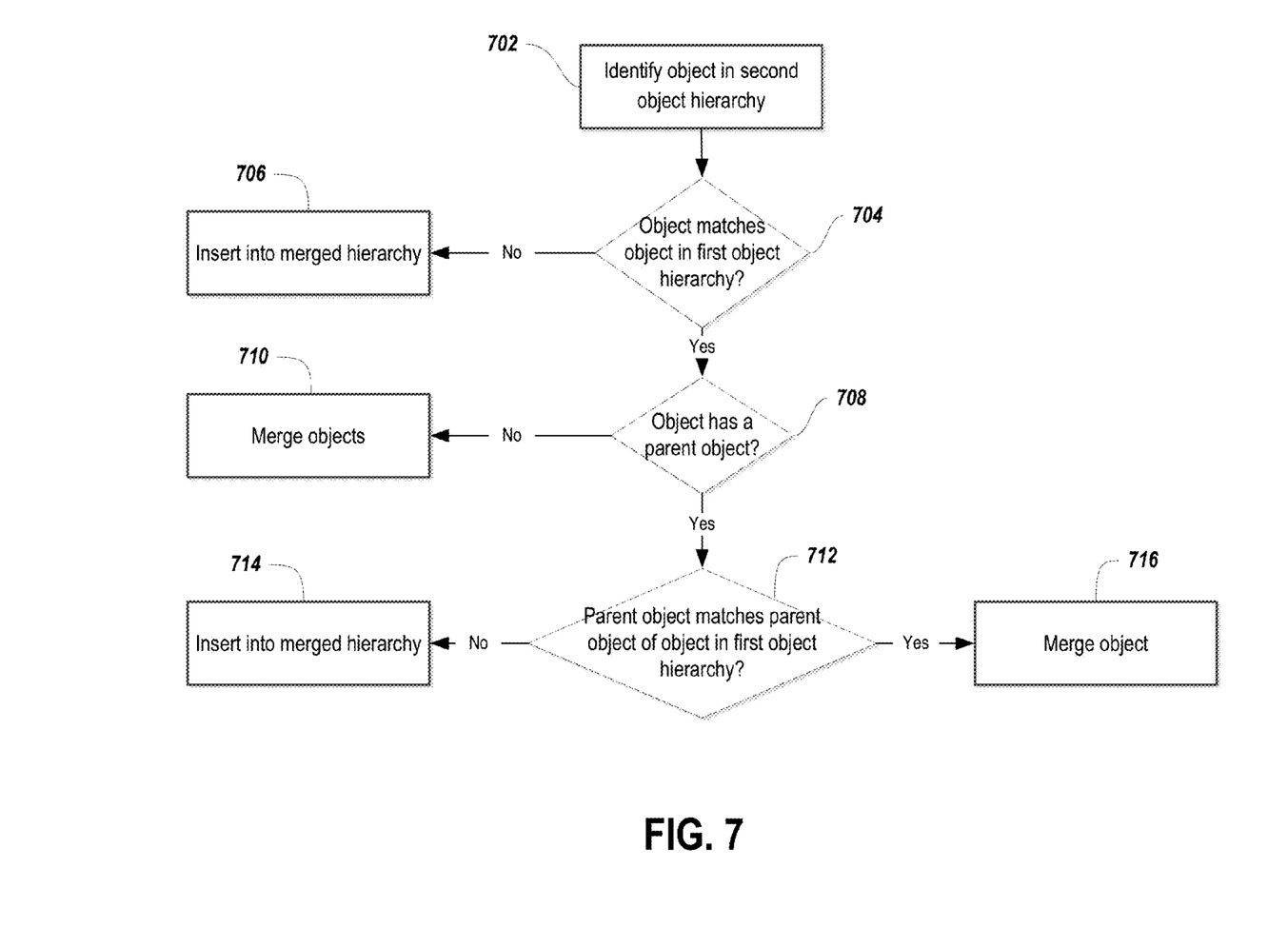
FIG. 7 is flow chart showing an example method for determining how to merge a particular data object.

FIG. 7 is flow chart showing an example method for determining how to merge a particular data object. For clarity of presentation, the description that follows generally describes method 700 in the context of FIGS. 1-5. However, method 700 may be performed, for example, by any other suitable system, environment, software, and hardware, or a combination of systems, environments, software, and hardware, as appropriate. For example, one or more of the data management system, the client, or other computing device (not illustrated) can be used to execute method 700 and obtain any data from the memory of the client, data management system, or the other computing device (not illustrated).

At 702, an object in the second object hierarchy is identified. In some implementations, the method 700 is repeated for each object in the second hierarchy. At 704, a determination is made whether the identified object matches an object in the first object hierarchy. In some implementations, this determination is performed by comparing an identifier associated with each object, or comparing a name associated with each object, as previously described.

If the object from the second object hierarchy does not match any objects in the first object hierarchy, the method continues to 706, where the object is inserted into the merged hierarchy. If the object matches an object in the first hierarchy, the method 700 continues to 708, where determination is made whether the object has a parent object. If the object does not have a parent object, the method 700 continues to 710, and the objects from the first and second hierarchy are merged.

If the object does have a parent object, the method 700 continues to 712, where determination is made whether the parent object matches the parent object of the object in the first object hierarchy. If the parent object does not match, the method 700 continues to 714, and the object is inserted into the merged hierarchy. If the parent object does match, the method 700 continues to 716, where the object from the second hierarchy and the object from the first hierarchy are merged. In some implementations, this merged object is inserted into the merged hierarchy. In some cases, three or more object hierarchies may be merged into a single merged hierarchy.

The preceding figures and accompanying description illustrate example processes and computer implementable techniques. Environment 100 (or its software or other components) contemplates using, implementing, or executing any suitable technique for performing these and other tasks. These processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
    identifying a first object hierarchy including one or more objects, each of the one or more objects representing a query associated with a data set, each of the objects in the first object hierarchy associated with a key value;
    identifying a second object hierarchy including one or more objects, each of the objects in the second object hierarchy associated with a key value; and
    generating a merged object hierarchy including the one or more objects from the first object hierarchy and the one or more objects from the second object hierarchy, wherein generating the merged hierarchy includes, for each object in the second object hierarchy:
        determining whether the object in the second object hierarchy matches an object in the first object hierarchy; and
        in response to a determination that the object in the second object hierarchy matches an object in the first hierarchy:
            determining whether the object in the second object hierarchy has a parent object and determining whether the object in the first object hierarchy has a parent object;
            in response to a determination that the object in the second object hierarchy has a parent object and the object in the first object hierarchy does not have a parent object, merging the object in the first object hierarchy and the object in the second object hierarchy;
            in response to a determination that the object in the second object hierarchy and the object in the first object hierarchy have a common parent object, merging the object in the first object hierarchy and the object in the second object hierarchy; and
            in response to a determination that the object in the second object hierarchy and the object in the first object hierarchy have different parent objects, separately maintaining the object in the first object hierarchy and the object in the second object hierarchy.

2. The method of claim 1, wherein determining whether the object in the second object hierarchy matches the object in the first object hierarchy includes:
    comparing a name associated with the objects.

3. The method of claim 1, wherein merging the object in the first object hierarchy and the object in the second object hierarchy includes inserting a merged object into the merged hierarchy, the merged object including data from the object in the first object hierarchy and the object in the second object hierarchy.

4. The method of claim 3, wherein the merged object further includes data from descendant objects of the object from the first object hierarchy and the object from the second object hierarchy.

5. The method of claim 1, wherein separately maintaining the object from the first object hierarchy and the object from the second object hierarchy includes inserting both the object from the first object hierarchy and the object from the second object hierarchy into the merged hierarchy.

6. The method of claim 5, wherein inserting both the object from the first object hierarchy and the object from the second object hierarchy into the merged hierarchy includes inserting descendant objects of the object from the first object hierarchy and the object from the second object hierarchy into the merged hierarchy.

7. A non-transitory, computer-readable medium storing instructions operable when executed to cause at least one processor to perform operations comprising:
    identifying a first object hierarchy including one or more objects, each of the one or more objects representing a query associated with a data set, each of the objects in the first object hierarchy associated with a key value;

identifying a second object hierarchy including one or more objects, each of the objects in the second object hierarchy associated with a key value; and generating a merged object hierarchy including the one or more objects from the first object hierarchy and the one or more objects from the second object hierarchy, wherein generating the merged hierarchy includes, for each object in the second object hierarchy:

determining whether the object in the second object hierarchy matches an object in the first object hierarchy; and in response to a determination that the object in the second object hierarchy matches an object in the first hierarchy:

determining whether the object in the second object hierarchy has a parent object and determining whether the object in the first object hierarchy has a parent object;

in response to a determination that the object in the second object hierarchy has a parent object and the object in the first object hierarchy does not have a parent object, merging the object in the first object hierarchy and the object in the second object hierarchy;

in response to a determination that the object in the second object hierarchy and the object in the first object hierarchy have a common parent object, merging the object in the first object hierarchy and the object in the second object hierarchy; and in response to a determination that the object in the second object hierarchy and the object in the first object hierarchy have different parent objects, separately maintaining the object in the first object hierarchy and the object in the second object hierarchy.

8. The computer-readable medium of claim 7, wherein determining whether the object in the second object hierarchy matches the object in the first object hierarchy includes:

comparing a name associated with the objects.

9. The computer-readable medium of claim 7, wherein merging the object in the first object hierarchy and the object in the second object hierarchy includes inserting a merged object into the merged hierarchy, the merged object including data from the object in the first object hierarchy and the object in the second object hierarchy.

10. The computer-readable medium of claim 9, wherein the merged object further includes data from descendant objects of the object from the first object hierarchy and the object from the second object hierarchy.

11. The computer-readable medium of claim 7, wherein separately maintaining the object from the first object hierarchy and the object from the second object hierarchy includes inserting both the object from the first object hierarchy and the object from the second object hierarchy into the merged hierarchy.

12. A system comprising:

memory for storing data; and one or more processors operable to perform operations comprising:

identifying a first object hierarchy including one or more objects, each of the one or more objects representing a query associated with a data set, each of the objects in the first object hierarchy associated with a key value;

identifying a second object hierarchy including one or more objects, each of the objects in the second object hierarchy associated with a key value; and generating a merged object hierarchy including the one or more objects from the first object hierarchy and the one or more objects from the second object hierarchy, wherein generating the merged hierarchy includes, for each object in the second object hierarchy:

determining whether the object in the second object hierarchy matches an object in the first object hierarchy; and in response to a determination that the object in the second object hierarchy matches an object in the first hierarchy:

determining whether the object in the second object hierarchy has a parent object and determining whether the object in the first object hierarchy has a parent object;

in response to a determination that the object in the second object hierarchy has a parent object and the object in the first object hierarchy does not have a parent object, merging the object in the first object hierarchy and the object in the second object hierarchy;

in response to a determination that the object in the second object hierarchy and the object in the first object hierarchy have a common parent object, merging the object in the first object hierarchy and the object in the second object hierarchy; and in response to a determination that the object in the second object hierarchy and the object in the first object hierarchy have different parent objects, separately maintaining the object in the first object hierarchy and the object in the second object hierarchy.

* * * * *